(12) United States Patent
McKinney et al.

(10) Patent No.: US 6,612,042 B1
(45) Date of Patent: *Sep. 2, 2003

(54) THREAD GAGE SYSTEM AND METHOD

(75) Inventors: Trevor O'Bryan McKinney, Fort Wayne, IN (US); Roderick Brent Dillon, Fort Wayne, IN (US); Russell R. Bow, Fort Wayne, IN (US)

(73) Assignee: Torque-Traction Technologies, Inc., Holland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/078,388

(22) Filed: Feb. 21, 2002

(51) Int. Cl.[7] .................................................. G01B 3/50
(52) U.S. Cl. ...................... 33/501.7; 33/199 R; 33/626; 33/545; 33/DIG. 14
(58) Field of Search .......................... 33/501.7, 501.11, 33/501.14, 501.16, 501.05, 501.08, 501.45, 199 R, 613, 645, 626, 655, 545, 549, 555, DIG. 14; 285/93

(56) References Cited

U.S. PATENT DOCUMENTS

| | | | |
|---|---|---|---|
| 2,200,885 A | | 5/1940 | Johnson |
| 2,347,352 A | * | 4/1944 | Lapsley ..................... 74/15.2 |
| 2,736,103 A | | 2/1956 | Kahle |
| 2,782,521 A | * | 2/1957 | Parker et al. ............. 33/199 R |
| 2,883,760 A | * | 4/1959 | Eriksson .................. 33/199 R |
| 3,015,892 A | | 1/1962 | Stuart |
| 3,284,913 A | | 11/1966 | Satava |
| 4,519,144 A | | 5/1985 | Larsen |
| 4,530,158 A | | 7/1985 | Chauquet |
| 4,858,330 A | | 8/1989 | Larsen |
| 5,325,599 A | * | 7/1994 | Russell ....................... 33/517 |
| 5,546,666 A | * | 8/1996 | Och .......................... 33/501.7 |

* cited by examiner

Primary Examiner—Diego Gutierrez
Assistant Examiner—Amy R. Cohen
(74) Attorney, Agent, or Firm—Liniak, Berenato & White

(57) ABSTRACT

An inspection device for inspecting production of threaded members wherein the threaded members are inspected to ensure that when the threaded member is matched with a corresponding threaded hole in an automotive drive system, the threaded member will mate properly to serve its intended purpose. The apparatus of the invention is formed as a three-piece gage assembly that checks for lead errors and length errors set forth in the threaded member. The combination gage includes a substantially cylindrical gage spacer, a threaded ring gage, and a flush gage pin, which is associated with the threaded ring gage, having a low end mark and a high end mark thereon. The markings indicate proper/improper axial length of the threaded portion. The preferred embodiment is used to evaluate a drive pinion shaft of an automotive axle assembly.

10 Claims, 2 Drawing Sheets

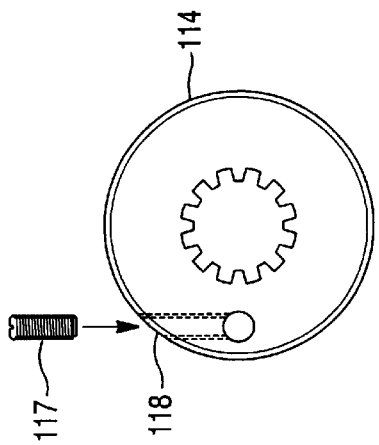
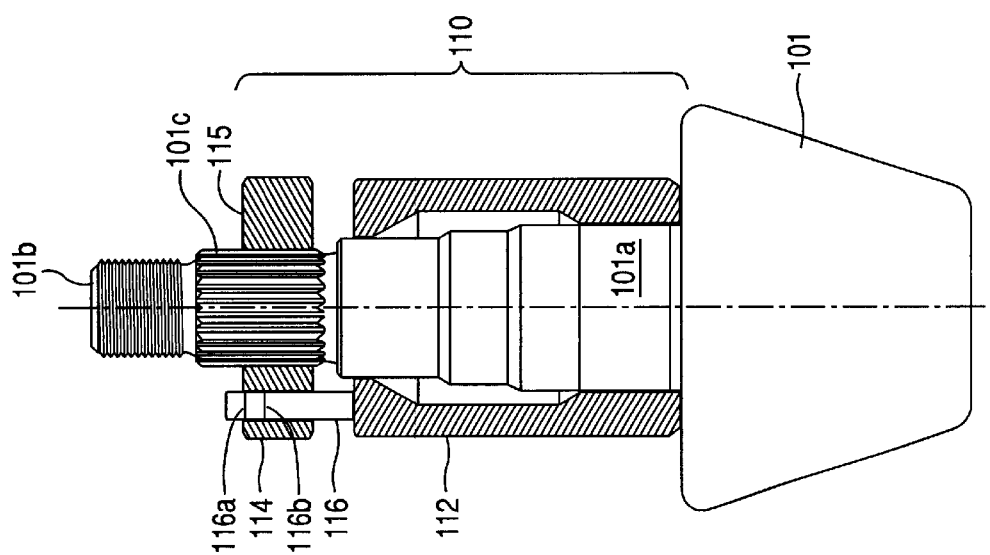

THREAD GAGE SYSTEM AND METHOD

BACKGROUND OF THE INVENTION

1. Field of the Invention

This invention is a device and method for measuring the size and length of external threads of an automotive pinion shaft or similar article having a combination of threads and splines disposed along a common axial shaft.

2. Description of the Prior Art

Heretofore, one of the principal costs in the production of splined and/or threaded shafts and fasteners has been the manual and visual inspection and sorting of dimensionally defective splined and threaded fasteners from the large volume automatic-machine production of such threaded members. Initially, in order to select from such high volume production, those threaded fasteners which contain dimensional defects including failure to tap or thread the shaft, severely deformed threads resulting from any number of manufacturing problems, or for any other reason wherein the threaded shaft has improper dimensional characteristics, manual and personal inspection is required and the associated costs constitutes a substantial part of the cost of production. In addition, personal or manual inspection is not only cost prohibitive but not always reliable, particularly as required for and by the large volume users of threaded fasteners such as manufacturers in the automotive industry. The same problem exists for splined shafts. To accommodate these requirements, sampling programs were implemented with reasonable success for monitoring the quality of the production volume of splined and threaded fasteners.

Additionally, the manufacturing and assembly process is hindered by incorrect splines and/or spline lengths. Conventionally, spline and/or thread lengths are checks using a ruler; however, this method is inaccurate, duplicative, and time consuming.

These and other factors have resulted in a vital and increasing need to enable evaluation of all critical dimensional criteria of splined and/or threaded members by the supplier. Statistical sampling is no longer an acceptable testing technique.

To attempt to provide 100 percent inspection, numerous systems based on optics and acoustics were developed and are presently known for dimensionally qualifying each and every splined and/or threaded member produced. For threaded fasteners, various non-contact inspection systems are known using various techniques. For example, ultrasonic inspection systems examine reflective sound waves as a means of characterizing a component. Various systems based on a video image of a part are also known. In addition, laser gaging systems are used in which specific dimensional measurements can be obtained. Inducing eddy currents to characterize dimensional characteristics is also a known prior art gaging system for the examination of threaded fasteners.

In general, however, although known non-contact inspection systems are extremely useful, they all have certain limitations. Many of the available non-contact gaging systems are complex data processing approaches which impose expensive hardware requirements and can limit the speed with which evaluations can be accomplished. Preferably, evaluation of a workpiece can be conducted in a rapid enough fashion that the parts can be directly sorted into qualified or disqualified part streams. Prior art systems also tend not to be easily adapted to various part configurations or for evaluating different features of a part. Moreover, many of the currently available non-contact inspection systems have limitations in terms of the number of parameters which can be effectively examined during the inspection process. Moreover, many prior art systems, although performing adequately in laboratory settings, are not sufficiently rugged for production environments where temperature variations, dust, dirt, cutting fluids, etc. are encountered.

In the prior art applications, none of the known gage inspection or gaging systems provide any information with respect to detail defects in the length of the spline or thread profile. That is, in many applications the splines or threads may be too long or too short for their particular application. Additionally, many threaded fasteners which are passed by the so called 100 percent inspection systems often have nicks within the thread which go undetected through the inspection system and are reported as an acceptable part, when in fact the nick in the thread will prevent the threaded part from being assembled to a complementary threaded member. The reason that such defects are undetectable by the sophisticated prior art laser systems is because most of the systems verify dimensional checks such as outside diameters, shaft diameter, shoulder location relative to an end, head height, overall length etc. Notwithstanding the correctness of all of these dimensional characteristics, none of the prior art systems ensure that the thread has not been damaged so that it will properly function with a complementary threaded hole or threaded nut.

According to one known technique, there is proposed an apparatus and method for facilitating final inspection as to the pitch diameter of the thread through the use of a go-no go member that tests the pitch diameter of a threaded member. If the thread of the screw matches with the contour of the gage head, then the screw will be deemed acceptable. If there is a no-go condition (no match) at the gage head, then the part is deemed unacceptable.

Such conventional systems are concerned with testing for pitch diameter, so as to enable sorting of threaded parts; however, it should be noted that such testing is limited strictly to a cross-sectional outline of the threaded part being matched with the gage head of the testing device. Accordingly, thread length cannot necessarily be detected and a thread, which properly meets the condition of the go/no-go gage of the invention, may still be unable to be utilized in conjunction with a complementary threaded bore or threaded nut for which it is intended.

Accordingly, there has been a long felt need in the art for a machine that would efficiently and effectively check the screw thread of a threaded shaft to ensure that the screw thread will properly match a corresponding hole in an fastener, or, in the alternative, that the spline thread will properly match a corresponding splined female member, there will be no question that the two will properly be allowed to mate and perform the intended function. No solution currently exists for solving the above-identified problem. Accordingly, what is needed is a 100 percent mechanized inspection device which will ensure the functionality of a spline/thread found on a shaft with a complementary female spline/thread in the bore of a hole or in a nut such that the threaded fastener may serve its intended purpose.

What is therefore needed is an external thread gage that is reliable and simple in design and that allows the gage segments to be easily removed and replaced.

SUMMARY OF THE INVENTION

In accordance with the present invention, a method and apparatus for functionally testing and sorting splined and/or threaded members during the assembly process is provided. The apparatus of the invention is formed as a three-piece gage assembly that checks for lead errors and length errors for splined and/or threaded members.

The three-piece gage assembly sequentially checks the condition of the splines and/or threads by interaction with a mating component, then the mating component is used to measure the length of the spines and/or threads.

According to one aspect of the invention, a combination pinion thread size and length gage for a pinion gear shaft of a vehicular axle assembly is provided. The combination gage includes a substantially cylindrical gage spacer, a thread ring gage, and a flush gage pin, which is associated with the thread ring gage, having a low end mark and a high end mark thereon. In operation, first, the gage spacer is inserted over a pinion stem, then the thread ring gage is inserted over a threaded portion of the pinion stem. If the thread ring gage does not screw on, the pinion stem is rejected as defective. If the gage spline ring does screw on, the threads of the pinion stem are in accordance with the specification. In this case, the thread ring gage is screwed down all the way to the end, then the gage pin is pressed down until it seats on the gage spacer. If the low end mark of the gage pin is below a face surface of the gage spline ring, the threaded portion of the pinion stem is too long. If the high end mark of the gage pin is below a face surface of the gage spline ring, the threaded portion of the pinion stem is too long.

According to another aspect of the invention, a combination pinion spline size and length gage for a pinion gear shaft of a vehicular axle assembly is provided. The combination gage includes a substantially cylindrical gage spacer, a spline ring gage, and a gage pin associated with the spline ring gage. The gage pin has a low end mark and a high end mark thereon. In operation, first, the gage spacer is inserted over a pinion stem, then the spline ring gage is inserted over a spline portion of the pinion stem. If the spline ring gage does not fit, the pinion stem is rejected as defective. If the spline ring gage does fit, the pinion stem is in accordance with the specification. In this case, the spline ring gage is pushed down all the way to the end, then the gage pin is pressed down until it seats on the gage spacer. If the low end mark of the gage pin is below a face surface of the spline ring gage, the spline portion of the pinion stem is too long. If the high end mark of the gage pin is below a face surface of the spline ring gage, the spline portion of the pinion stem is too long.

While the preferred embodiment of the present invention has been described in relation to a pinion gear shaft used in an automotive axle assembly, the principals and concepts of this invention have a wide variety of applications and uses.

BRIEF DESCRIPTION OF THE DRAWINGS

FIG. 4 is a length-wise sectional view of the combination pinion spline size and length gage for a pinion gear shaft of a vehicle axle assembly.

FIG. 5 is a plan view of the spline ring gage shown in FIG. 4.

DETAILED DESCRIPTION OF THE PREFERRED EMBODIMENTS

Figure 3:
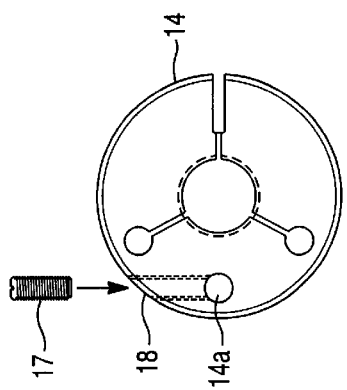
FIG. 3 is a plan view of the thread ring gage shown in FIG. 1.
Figure 2:
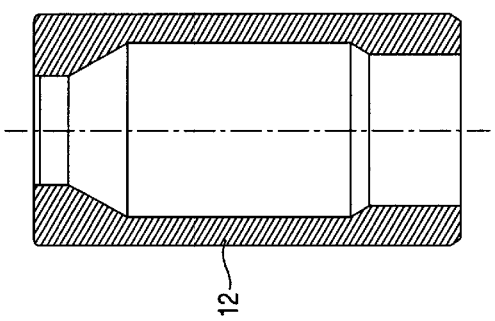
FIG. 2 is a cross sectional view of the cylindrical gage spacer shown in FIG. 1.
Figure 1:
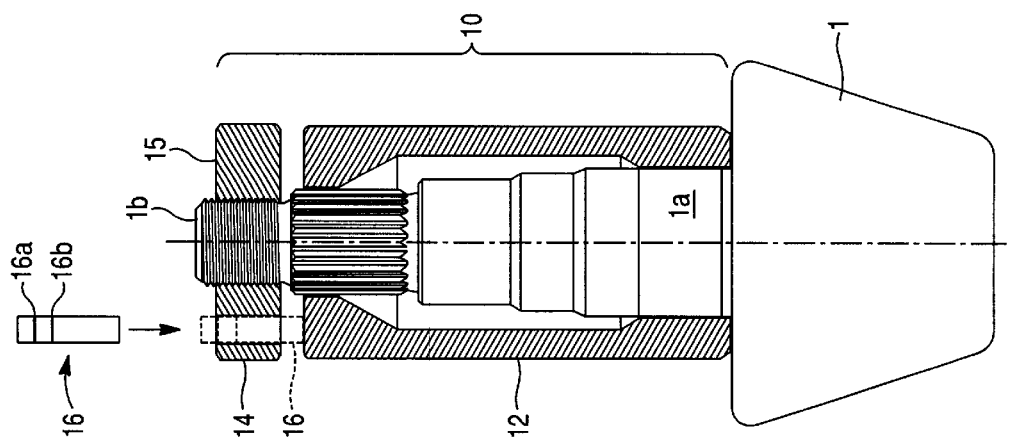
FIG. 1 is a length-wise sectional view of the combination pinion thread size and length gage for a pinion gear shaft of a vehicle axle assembly.

With reference to FIGS. 1–3, the first embodiment showing the combination pinion thread size and length gage of the instant invention will be described.

According to the embodiment of FIGS. 1–3, a combination pinion thread size and length gage 10 for a pinion gear shaft 1 of a vehicular axle assembly is provided. The combination gage 10 includes a substantially cylindrical gage spacer 12, a thread ring gage 14, and a flush gage pin 16, which is associated with the thread ring gage 14, having a low end mark 16a and a high end mark 16b provided thereon.

In operation, first, the gage spacer 12 is inserted over a pinion stem 1a, then the thread ring gage 14 is inserted over a threaded portion 1b of the pinion stem 1a. If the thread ring gage 14 does not screw properly on the threaded portion 1b, the pinion stem 1a is rejected as having defective threads. If the thread ring gage 14 does screw properly on the threaded portion 1b, the threads of the pinion stem 1a are deemed to be in accordance with the thread specification. In this case, the thread ring gage 14 is screwed down all the way to the end of the threaded portion 1b. Next, the gage pin 16 is pressed down through an opening 14a in the thread ring gage 14 until it seats on the gage spacer 12. Once seated on the gage spacer 12, if the low end mark 16b of the gage pin 16 is below a face surface 15 of the thread ring gage 14, the threaded portion 1b of the pinion stem is too long. Once seated, if the high end mark 16a of the gage pin 16 is below the face surface 15 of the thread ring gage 14, the threaded portion 1b of the pinion stem 1a is too long.

It is also noted that the thread ring gage 14 is provided with a set screw 17 and mounting hole 18 to lock the gage pin 16 in place during measurement and evaluation.

Manufacturers and parts suppliers have been having problems with the length of threads being too short or too long. The problem inherent in the prior art is the inability to gage the length of the threads with respect to the thrust face of the pinion. The use of a flush pin 16 according to this invention guarantees whether the part is conforming or not. With this invention, the length gage is incorporated into the thread ring gage 14 to provide an accurate location relative to the pinion and other components.

According to another aspect of the invention shown in FIGS. 4 and 5, a combination pinion spline size and length gage 110 for a pinion gear shaft 101 of a vehicle axle assembly is provided. The combination gage 110 includes a substantially cylindrical gage spacer 112, a spline ring gage 114, and a gage pin 116 associated with the spline ring gage 114. The gage pin 116 has a low end mark 116b and a high end mark 116a thereon. In operation, first, the gage spacer 112 is inserted over a pinion stem 110a, then the spline ring gage 114 is inserted over a spline portion 101c after passing over the threaded portion 101b of the pinion stem 101a. If the spline ring gage 114 does not fit properly along the spline portion 101c, the pinion stem 101a is rejected as defective. If the spline ring gage 114 does fit properly, the pinion stem 101a is formed in accordance with the specification. In this case, the spline ring gage 114 is pushed down all the way to the end of the spline portion 101c, then the gage pin 116 is pressed down through the aperture 114a until it seats on the gage spacer 112 (see FIG. 4). If the low end mark 116b of the gage pin 116 is below a face surface 115 of the spline ring gage 114, the spline portion 101b of the pinion stem 101a is too long. If the high end mark 116b of the gage pin 116 is below a face surface 115 of the spline ring gage 114, the spline portion 101 1b of the pinion stem 101a is too short.

It is also noted that the thread ring gage 114 is provided with a set screw 117 and mounting hole 118 to lock the gage pin 116 in place during measurement and evaluation.

Manufacturers and parts suppliers have been having problems with the length of splines being too short or too long. The problem inherent in the prior art is the inability to gage the length of the splines with respect to the thrust face of the pinion. The use of a flush pin 116 according to this invention guarantees whether the part is conforming or not. With this invention, the length gage is incorporated into the spline ring gage 114 to provide an accurate location relative to the pinion and other components.

While this invention has been shown and described with references to preferred embodiments thereof, it will be understood by those of skill in the art that various changes in form and detail may be made therein without departing from the spirit and scope of the instant invention as delineated in the associated claims.

What is claimed is:

1. A combination pinion thread size and length gage for a drive pinion shaft, said drive pinion shaft including a pinion gear member and a stem member extending from said pinion gear member, and a threaded portion having a length and threads integrally formed on said stem member, said combination gage comprising:

a gage spacer having a first end face abutting a thrust face of said pinion gear member and a second end face opposite to said first end face;

a thread ring gage for gauging size of said threads of said drive pinion shaft, said thread ring gage having a central internally threaded gauging bore, said thread ring gage further having a gage surface; and a gage pin slideably supported by said thread ring gage and abutting said second end face of said gage spacer when gauging said threads, wherein position of said gage pin relative to said gage surface of said thread ring gage is indicative to said length of said threaded portion.

2. The combination gage of claim 1, wherein said gage spacer is substantially cylindrical in shape.

3. The combination gage of claim 1, wherein said gage spacer is adapted to be inserted over at least a portion of said stem member of said drive pinion shaft.

4. The combination gage of claim 1, wherein said threaded ring gage comprises an aperture for receiving said gage pin.

5. The combination gage of claim 1, wherein said gage pin has at least one indicator thereon for indicating a relative position of said gage pin and said ring gage.

6. The combination gage of claim 5, wherein said at least one indicator comprises a high end mark and a low end mark defining a tolerance region indicative of an acceptable thread length.

7. The combination gage of claim 1, wherein said ring gage comprises at least one set screw for locking said gage pin relative to said ring gage.

8. A method of measuring and inspecting thread size and length for a pinion gear shaft of a vehicle axle assembly, said method comprising the steps of:

positioning a gage spacer relative to a pinion stem;

threading a thread ring gage over a threaded portion of the pinion stem;

checking if the thread ring gage mates properly with the pinion stem screwing the thread ring gage down all the way to the end of said threaded portion;

positioning a gage pin until said gage pin is seated on the gage spacer;

monitoring a position of said gage pin relative to a gage surface of said thread ring gage to ascertain a length of said threaded portion.

9. The method according to claim 8, wherein said step of positioning said gage spacer comprises the step of inserting said gage spacer over said pinion stem.

10. The method according to claim 8, wherein said step of positioning said gage pinion comprises inserting said gage pin into an aperture provided on said thread ring gage.

* * * * *